United States Patent [19]
Hirata et al.

[11] Patent Number: 5,056,058
[45] Date of Patent: Oct. 8, 1991

[54] COMMUNICATION PROTOCOL FOR PREDICTING COMMUNICATION FRAME TYPE IN HIGH-SPEED PROCESSING SYSTEM

[75] Inventors: Tetsuhiko Hirata; Susumu Matsui; Matsuaki Terada; Tatsuya Yokoyama, all of Machida; Sinichi Kouyama, Hiratsuka, all of Japan

[73] Assignee: Hitachi, Ltd., Tokyo, Japan

[21] Appl. No.: 489,243

[22] Filed: Mar. 5, 1990

[30] Foreign Application Priority Data

Mar. 13, 1989 [JP] Japan ................................. 1-57701

[51] Int. Cl.⁵ .................. G06F 15/56; G06F 15/16; G06F 13/00
[52] U.S. Cl. .................. 364/900; 364/940; 364/940.61; 364/940.81; 364/927.92; 364/927.93; 364/940.64; 370/60; 370/94.1
[58] Field of Search ... 364/200 MS File, 900 MS File; 370/60, 94.1, 24; 340/825.06

[56] References Cited

U.S. PATENT DOCUMENTS

| | | | |
|---|---|---|---|
| 4,357,681 | 11/1982 | Chadra | 364/900 |
| 4,363,093 | 12/1982 | Davis et al. | 364/200 |
| 4,495,572 | 1/1985 | Bosen | 364/200 |
| 4,564,900 | 1/1986 | Smitt | 364/200 |
| 4,567,595 | 11/1986 | Hedlund | 364/200 |
| 4,584,684 | 4/1986 | Nagasawa et al. | 364/200 |
| 4,661,902 | 4/1987 | Hochsprung et al. | 364/200 |
| 4,734,907 | 3/1988 | Turner | 370/60 |
| 4,764,920 | 8/1988 | Furuya | 370/94.1 |
| 4,926,375 | 5/1990 | Mercer et al. | 364/900 |
| 4,999,835 | 3/1991 | Lagoutte | 370/94.1 |

OTHER PUBLICATIONS

William Stallings, Local Networks, 1987, An Introduction, Second Edition.

Primary Examiner—Allen R. MacDonald
Assistant Examiner—Gopal C. Ray
Attorney, Agent, or Firm—Fay, Sharpe, Beall, Fagan, Minnich & McKee

[57] ABSTRACT

A protocol high-speed processing method to be used in a first communication control equipment for communications with a second communication equipment connected through a transmission line in accordance with a predetermined communication protocol. The communication control equipment predicts the type of communication frame to be received next from the communication line, in accordance with type of communication frame previously transmitted to or received from said transmission line, and prepares information necessary for a process of receiving said predicted communication frame and information of a part of the communication frame to be transmitted subsequent to the receiving process, to await the reception of a next communication frame. As a result, the receiving process time and the response process time can be reduced when the actually received communication frame is consistent with the predicted one.

7 Claims, 12 Drawing Sheets

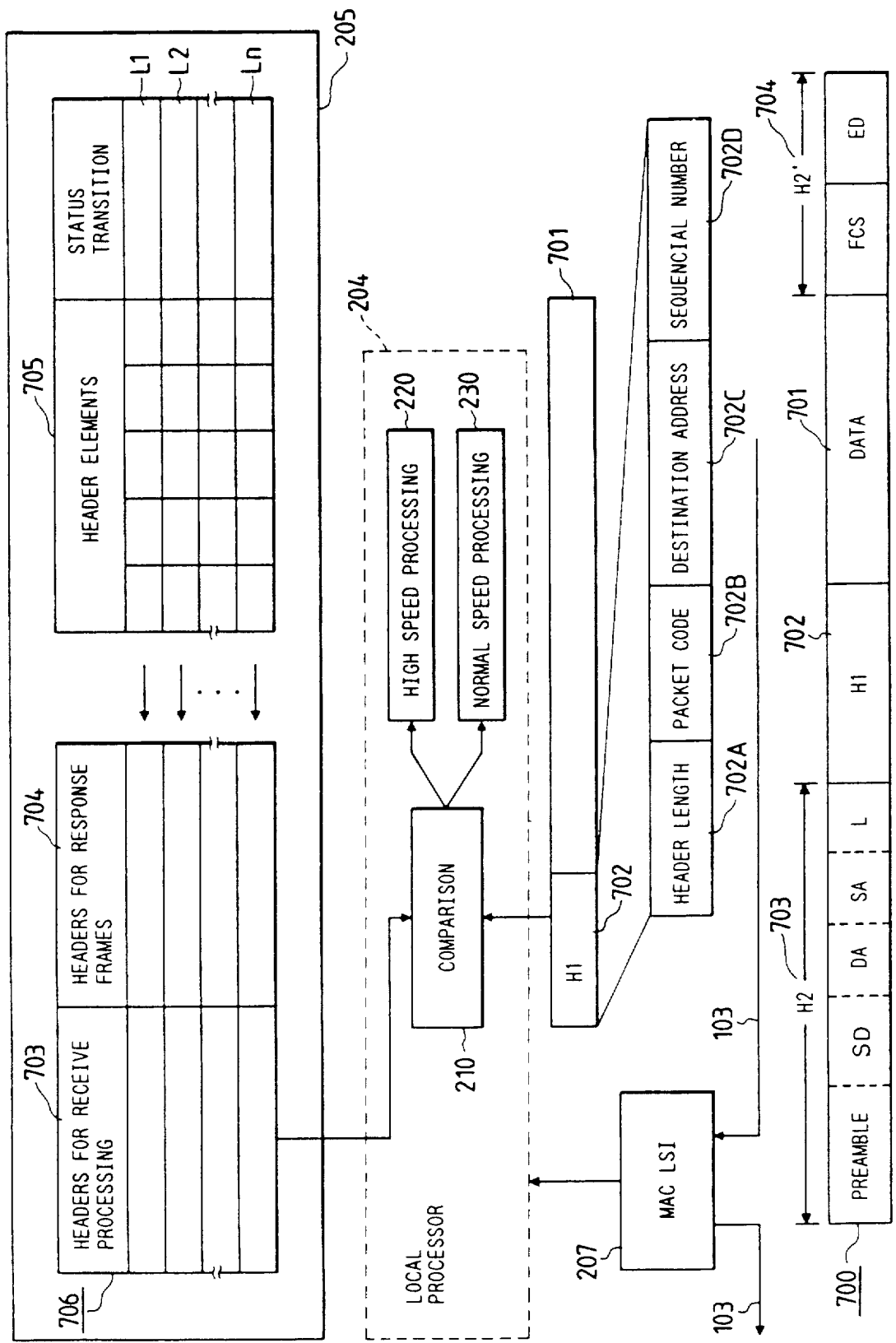

FIG. 8A "CR"
| LI 401 | CR CODE | CRT 403 | DST-REF 404 | SRC-REF 405 | CLASS OPTION 408 | VARIABLE PORTION 410 | USER'S DATA (≤32 OCTET) 420 |

402CR ≤128

FIG. 8B "CC"
| LI 401 | CC CODE | CRT 403 | DST-REF 404 | SRC-REF 405 | CLASS OPTION 408 | VARIABLE PORTION 410 | USER'S DATA (≤32 OCTET) 420 |

402CC

FIG. 8C "DT"
| LI 401 | DT CODE 402DT | DST-REF 404 | TPDU-NR EOT 406 | VARIABLE PORTION 410 | USER'S DATA 420 |

FIG. 8D "AK"
| LI 401 | AK CODE | CRT 403 | DST-REF 404 | YR-TU-NR 407 | VARIABLE PORTION 410 |

402AK

FIG. 8E "DR"
| LI 401 | DR CODE 402DR | DST-REF 404 | SRC-REF 405 | REASON 409 | VARIABLE PORTION 410 | USER'S DATA (≤64 OCTET) 420 |

FIG. 8F "DC"
| LI 401 | DC CODE 402DC | DST-REF 404 | SRC-REF 405 | VARIABLE PORTION 410 |

COMMUNICATION PROTOCOL FOR PREDICTING COMMUNICATION FRAME TYPE IN HIGH-SPEED PROCESSING SYSTEM

BACKGROUND OF THE INVENTION

1. Field of the Invention

The present invention relates to a communication protocol high-speed processing system in an information communication network, communication control equipment for executing the system, and protocol high-speed conversion equipment adopting the system.

2. Description of the Prior Art

In the prior art, processes of communication protocol in an information communication network are started by determining the kind of a received frame at an instant when the receiving process of the information frame (or packet) is ended. One system for shortening the time period from the receiving of the frame to the sending of the acknowledgment is disclosed in Japanese Patent Laid-Open No. 62-164345, a system which utilizes the fact that the information frame is divided into data and a control field preceding the data, 1.) to judge receiving ends of a control field and data through hardware control, 2.) to start the preparations of decoding and sending of the control field at the end of the receive processing of the control field, 3.) to start the processing of the data at the end of the receive processing of all the data, and 4.) to disperse the time bands of the processing by a micro program thereby to shorten the time period from the frame receive processing to the acknowledgment sending.

The above-specified system notes that the preparations for sending the acknowledgment frame can be started at the end of the receive processing of the control field while not awaiting the end of the receive processing of the whole frame. The system still follows conventional, ordinal systems of the prior art in that the frame is decoded after it is received and still has a room for increased speed. In the layered communication protocol, moreover, there is room for improvements in the speed of layered protocol processing, whether the processing is to be accomplished by the hardware or software, and how the control field (i.e., a header) in the frame is to be processed.

SUMMARY OF THE INVENTION

An object of the present invention is to increase the speed of the receive processing of the communication protocol required when an information frame is received.

Another object of the present invention is to execute the receive processing of the information frame, when received, and the sending of the corresponding acknowledgment frame at high speed.

Still another object of the present invention is to shorten the processing time of the layered protocol by processing all the layers of the protocol together.

A further object of the present invention is to increase the speed of the processing of the header of the received frame.

A further object of the present invention is to provide communication control equipment capable of processing communication protocol at high speed.

A further object of the present invention is to provide protocol conversion equipment with short delay times having a structure in which networks having different protocols are connected by the protocol conversion equipment.

In order to achieve the above-specified objects, according to the present invention, the class, or type, of a received frame or a sent frame is collated with the protocol, when the received frame (or packet) from the end system (or station) at the other communication end has been processed or when the sent frame has been sent from this end, in order 1.) to specify the class, or type, of a frame to be predicted and 2.) to begin preparation of header processing for the next received frame. In order to increase the speed of the sending of an acknowledgment frame in response to a received frame, moreover, the header, or the like, of the acknowledgment frame to be sent next is prepared on the basis of the aforementioned frame prediction.

The present invention is further characterized by the fact that the layers of the layered protocol are processed together so that the increased speed of the aforementioned processing of the received frame and the sending of the acknowledgment frame can be applied to the individual layers of the layered protocol.

In the prior art, all the processings including the determination of the class, or kind, of the received frame, are started at an instant when the frame is actually received. In the present invention, however, the class, or kind, of a frame to be received next is predicted when one frame is received. The receive processing of the next frame is partially started before the frame is actually received so that the actual frame receive processing and the acknowledgment of the receive processing can be ended quickly. The predicted frame and the actually received frame may be different. In this case, the previously prepared header cannot be used for comparisons. However, the receive processing can be executed without any trouble by adopting a process like the prior art for comparing the header of the received frame and the information of the status management Table, only in this particular case.

On the other hand, the batch processing of the layered protocol is basically a development of the protocol high-speed processing, which is applied to single protocol (or layer) by the aforementioned received frame prediction, so that the protocol processing speed is increased by predicting the header of the layers at the time of receive processing of one frame for the batch processing. In this case, the classes, or types, of the actual frame and the predicted frame may be different from each other in some layers so that the individual layers have to be processed again. However, this reprocessing may be accomplished by the software or hardware control. Moreover, the individual layers may be re-processed, or the all of the layers be subjected to batch processing.

The predicted frame and the actually received frame are compared at a certain unit of the byte of words. In the case of inconsistency, the information bits may be individually decoded as in the prior art.

In the present invention, the increased speed of the aforementioned protocol processing can also be accomplished by hardware control. The processing of the header, for example, is accomplished by providing a control unit such as a header decoder. The acknowledgment frame may also be produced by the hardware. The portions of the processing failing to be accomplished by the hardware may be accomplished by the software (such as a microprocessor).

The foregoing and other objects, advantages, manner of operation and novel features of the present invention will be understood from the following detailed description when read in connection with the accompanying drawings.

BRIEF DESCRIPTION OF THE DRAWINGS

FIG. 7 is a block diagram for explaining the batch processing of frame headers, according to the present invention;

FIGS. 8A to 8F are diagrams showing representative packet formats;

DESCRIPTION OF THE PREFERRED EMBODIMENTS

The present invention will be described in connection with its first embodiment with reference to FIGS. 1 to 8.

Figure 1:
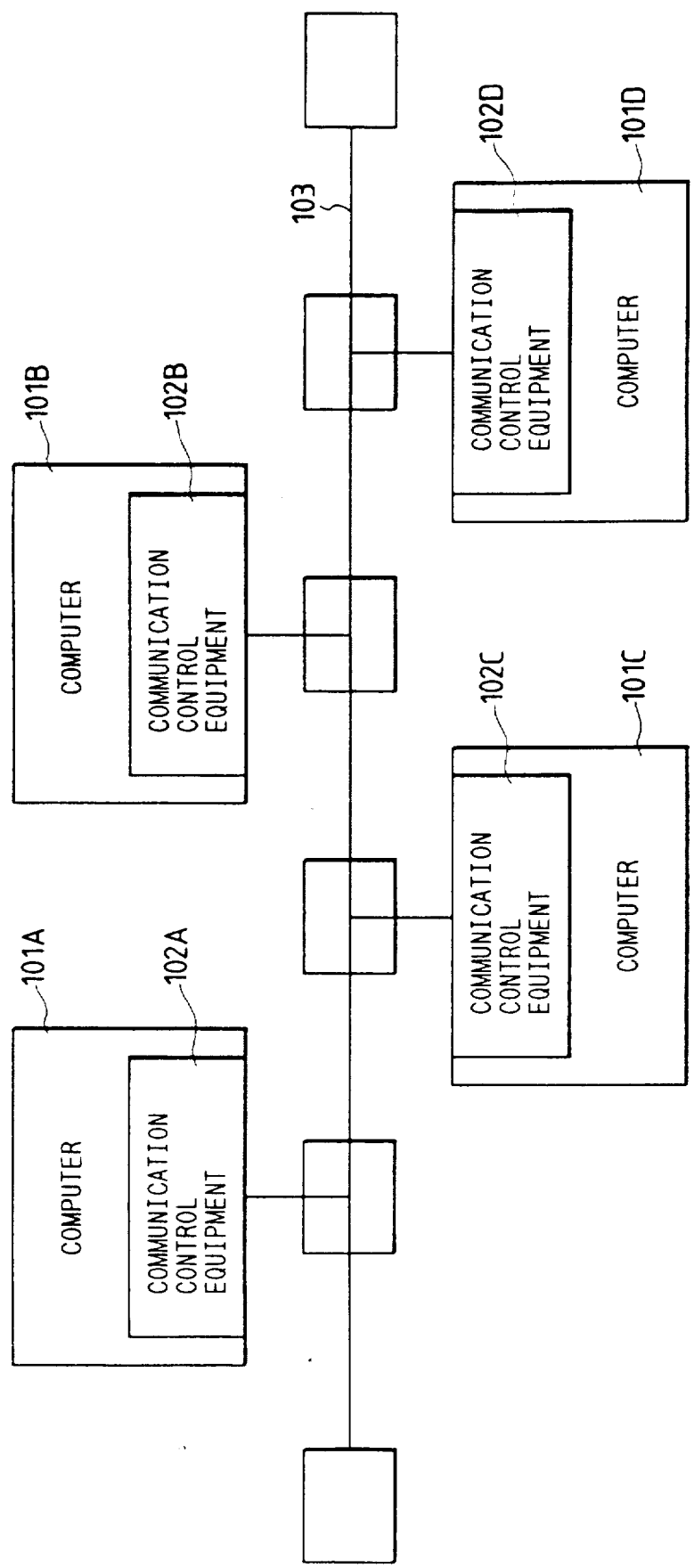
FIG. 1 is a block diagram showing an example of an information communication network system to which the present invention is applied.

FIG. 1 is a block diagram showing one example of the information communication network system carrying out the present invention. This system includes of a plurality of computers 101 (101A to 101D), which are individually connected with a network transmission line 103 through communication control equipment 102 (102A to 102D).

Figure 2:
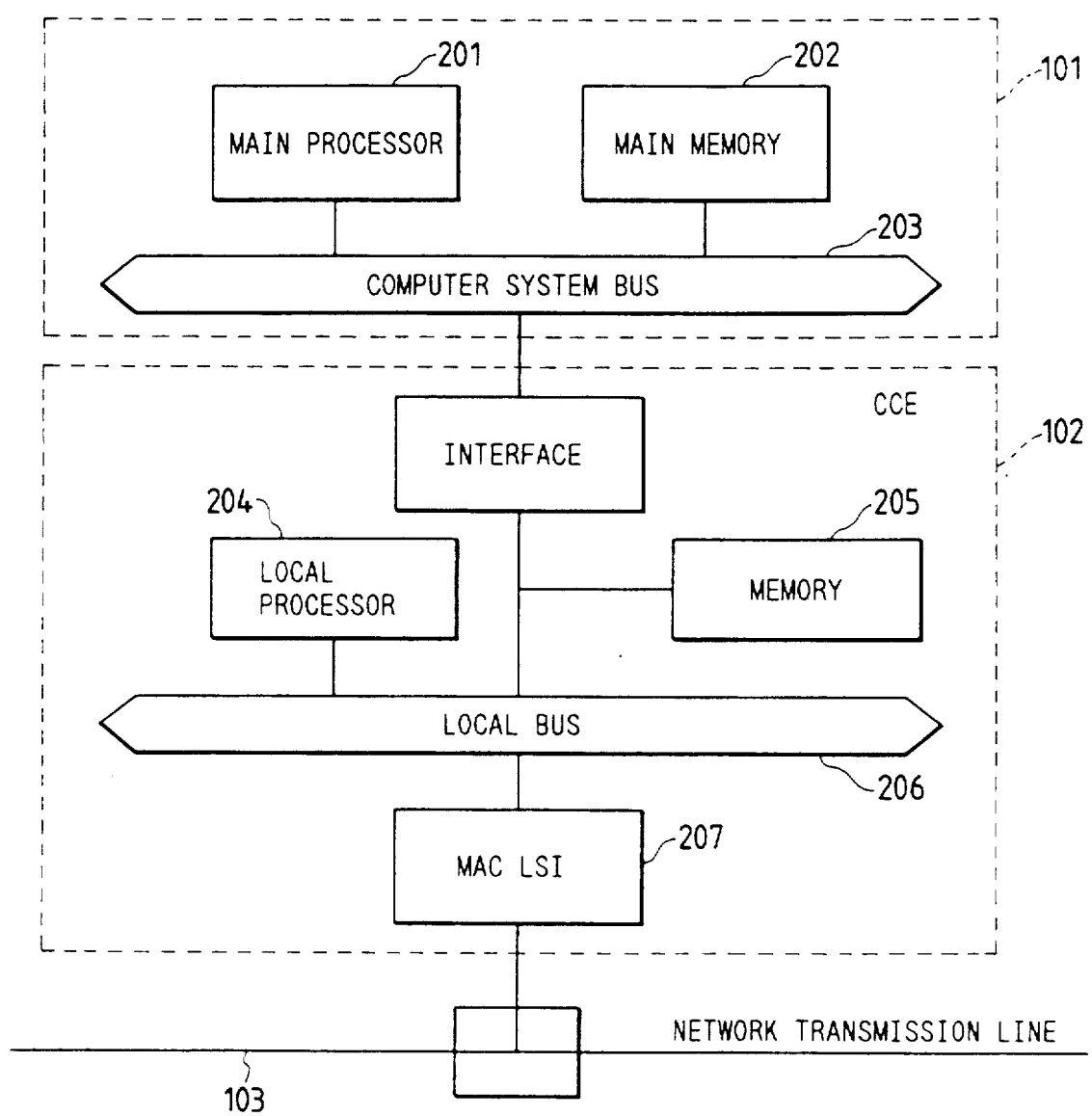
FIG. 2 is a block diagram showing the detail of communication control equipment 102 of FIG. 1.

FIG. 2 is a block diagram showing the detail of the communication control system 102. This communication control equipment 102 is connected with a system bus 203, which in turn is connected with a main processor 201 and a main memory 202 of the computer 101, so that it controls the communications in accordance with a protocol, as will be described with reference to FIG. 3. Specifically, the communication control equipment 102 is composed of: a medium access controller (MAC) LSI 207 for controlling the interface with the network transmission line 103 to transmit and receive data; a memory 205 for storing programs or data; a local processor 204 for managing the communication control equipment as a whole; and a local bus 206 for connecting the foregoing units. The present invention relates to a system for common communication protocol to be executed by the main processor 201 and the local processor 204. First of all, the protocol will be described in the following.

Figure 3:
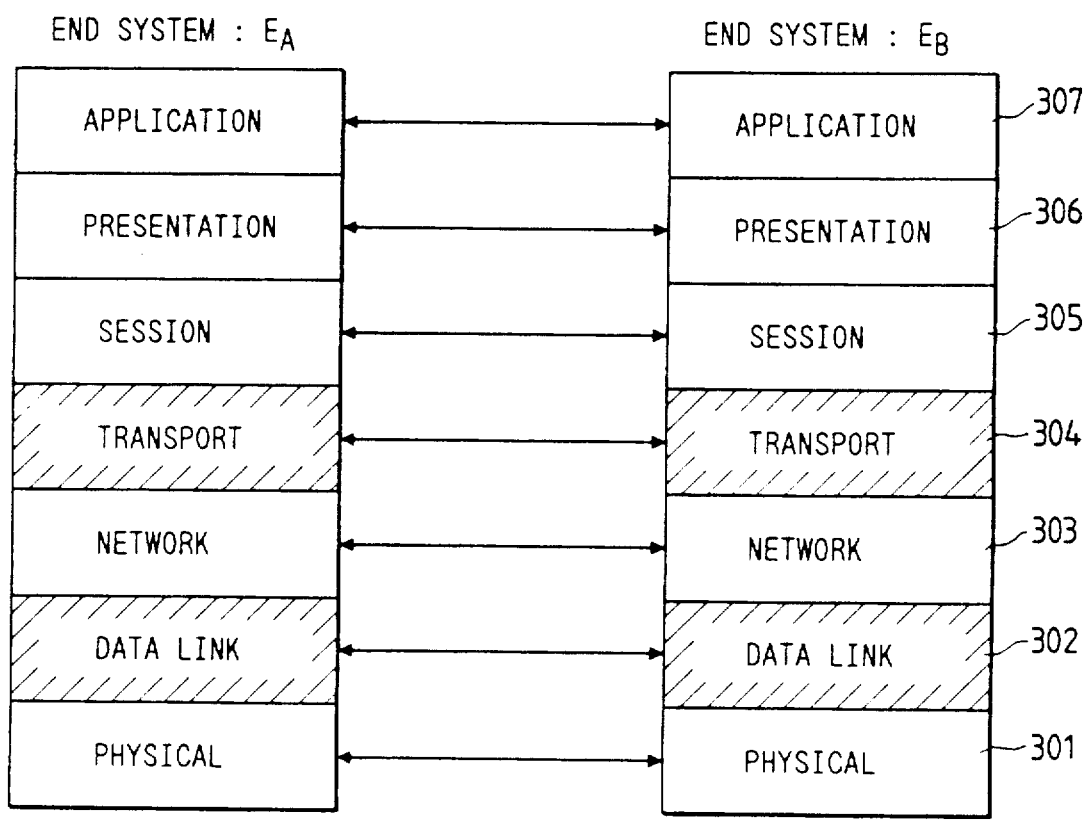
FIG. 3 is a diagram for explaining layered protocols of the network.

FIG. 3 shows a layered protocol in the information communication network. Each of end systems $E_A$ and $E_B$ has the layered protocol structure having layers from a transmission line level to an application level. This layered protocol is composed, as shown, of a physical layer 301, a data link layer 302, a network layer 303, a transport layer 304, a session layer 305, a presentation layer 306 and an application layer 307. Of these layers, the protocol of the transport layer 304 will be described in connection with the communication system according to the present invention by taking up the IS8073 class 4 of OSI as an example.

Figure 4:
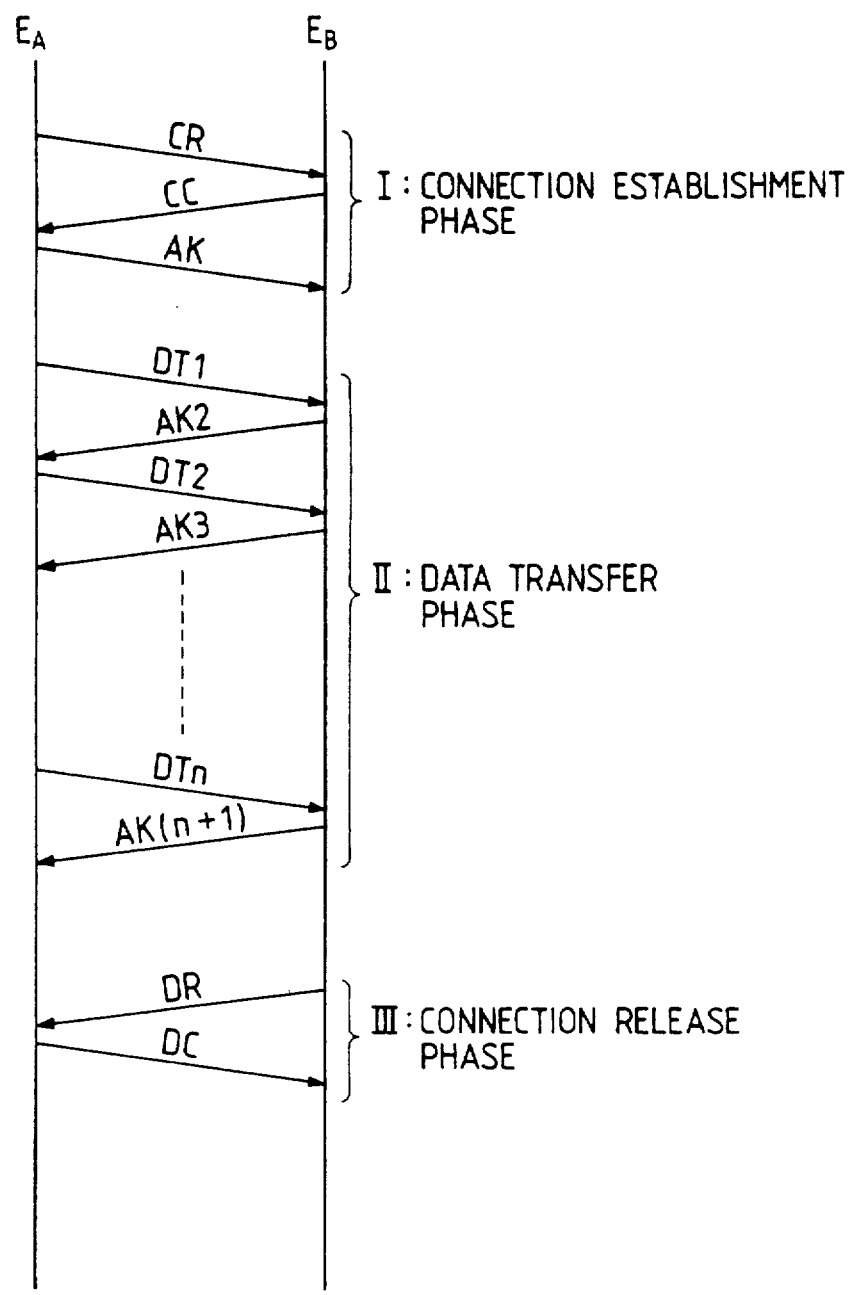
FIG. 4 is a diagram showing a representative sequence of transport layer protocol 304 of FIG. 3.

FIG. 4 shows a series of communication sequences from a connection establishment (I) to a data transfer (II) and connection release (IV) executed in accordance with the IS8073 class 4. In the connection establishment phase I, the end system $E_A$, a first station transmits a connection request packet CR to the other end system $E_B$, a second station so that the end system $E_B$ returns a connection confirm packet CC. In response to the CC, the end system $E_A$ transmits an acknowledgment AK and comes into connection establishment status. The phase is then transferred to the data transfer phase II to continue the controls in which the end system $E_B$ returns the acknowledgment packet AK each time it receives the data packet DT from the end system $E_A$. For releasing the connection, the end system $E_B$ transmits the connection release request packet DR so that the end system $E_A$ returns a packet DC acknowledging the connection release.

Figure 5:
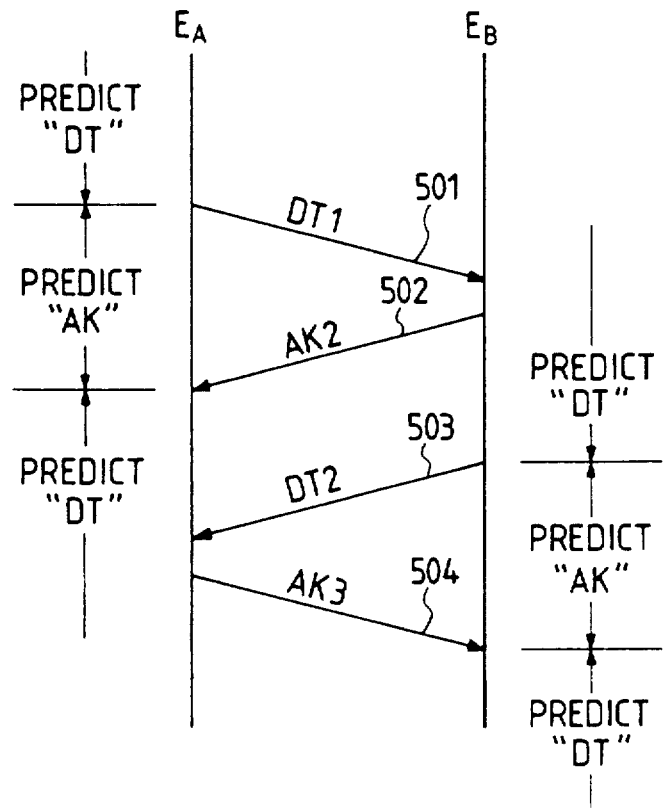
FIG. 5 is a diagram for explaining the increased speed of the receive processing in a data transfer phase II of FIG. 4, according to the present invention.

In FIG. 5, only the data transfer phase II of the above-specified transmission procedures is identified. The increased speed of the receive processing based upon the received frame predictions according to the present invention will be described in the following with reference to FIG. 5.

In the present invention, the end systems $E_A$ and $E_B$, having been transferred to the data transfer phase, predict the data package DT as a next received packet and await the packet from the partner end system while anticipating and being prepared for a decision information capable of instantly determining whether or not the kind of the received packet is "DT". The receive processing of the packet DT is predicted because after the data transfer phase is entered neither end systems has received the transmission packet from the partner system. Here, it is assumed (at Step 501) that a packet transmission request for a data packet DT1 is made in the end system $E_A$, for example, from an upper protocol layer or processor. Since the two end systems have predicted the receive processing of the DT packet, data packet DT1 can be processed at a high speed at the side of the end system $E_B$ having received the packet DT1, as predicted. The end system $E_B$, having received the packet DT1, returns (at Step 502) an acknowledgment packet AK2 to the partner system $E_A$. In this case, the end system $E_A$ predicts, when it transmits the data packet DT1, that a next received packet is the acknowledgment packet AK2 for the packet DT1, and is prepared for receiving the acknowledgment packet AK2. When the acknowledgment packet AK2 is actually received, its receive processing can be completed quickly. After this, the end system $E_A$ predicts again the DT because both the end systems $E_A$ and $E_B$ come into a standby status for the DT. If transmission of the data packet is requested on the side of the end system $E_B$, the processings of data packet DT2 (st Step 503) and the acknowledgment packet AK3 (at Step 504) can be executed at high speed, as predicted, by the two end systems $E_A$ and $E_B$.

Next, another embodiment of the present invention for increase the speed the receive processing of a next received frame and the transmissions of an acknowledgment frame by predicting the next received frame will be described with reference to FIG. 6.

Figure 6:
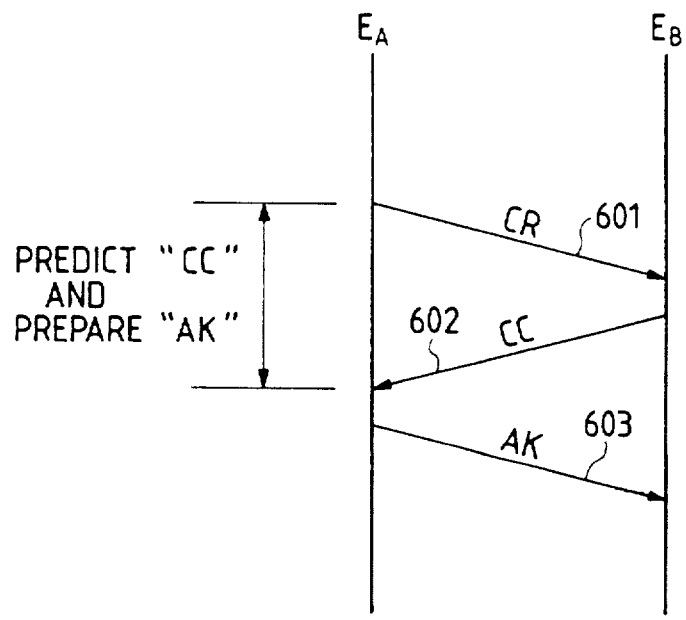
FIG. 6 is a diagram for explaining the increased speed of the acknowledgment sending in a connection establishment I of FIG. 4, according to the present invention.

FIG. 6 shows the connection establishment phase I of the transmitting and receiving procedures shown in FIG. 4. Assume that the request for the connection establishment is made from an upper-rank processor at the side of the end system $E_A$. In response to the aforementioned request, the end system $E_A$ transmits (at Step 601) the connection establishment request packet CR. At this instant, the end system $E_A$ predicts that a received packet from the end system $E_B$ at a next Step 602 will be the packet CC, because it has transmitted the CR packet, and makes preparations, such as reference header formations, for receiving the packet CC and for transmission (at Step 603) of an acknowledgment packet AK for the packet CC to be next received. Thus, a series of processings from the CC receive processing to the AK transmissions can take place after the CR transmissions at a high speed. Incidentally, increasing the speed of the aforementioned connection establishment phase I can be executed in combination with increasing the speed of the receive processing at the data transfer phase II which has been described with reference to FIG. 5.

Next, an embodiment for the batch processing of the frame header by predicting the received frame according to the present invention will be described in the following with reference to FIG. 7. In a typical communication system of the prior art, in response to a frame, the header of the received frame is analyzed for each information bit by determining the kind or class of the received frame. In the batch processing of the frame header according to the present invention, on the contrary, when the receive or transmit processing of one frame is ended, a reference header for the next received frame is anticipated and prepared to predict the class of a next received frame. The header of the actually received frame and the reference header are then compared and checked as a whole, i.e., for a plurality of bits.

In FIG. 7, a received frame 700 composed of a data field 701 and headers (H1, H2 and H2') 702 to 704 is transmitted on the line 103 according to the shown format. The header (H1) 702 and the data 701 are processed by the upper-rank protocol (i.e., the processor 201), whereas the headers (H2 and H2') 703 and 704, i.e., a preamble, a starting delimiter (SD), a destination address (DA), a source address (SA), a data length (L), a frame check sequence (FCS) and an ending delimiter (ED) are processed by an MAC-LSI 207 included in the communication control equipment 102. Here will be described the processing of the header (H1) 702 to be processed by the processor 204 constituting the communication control equipment 102. Specifically, the header 702 is composed of control informations such as a header length 702A, a packet code 702B, a destination address 702C and a sequence number 702D. In the processing of the header of the prior art, an associative connection is acknowledged from a connection management Table 705, which is prepared in advance on the memory 205, by identifying an associative connection from the destination address 702C. The received frame is processed by sequentially comparing the header element information stored in said Table and the header element of the received frame. In the present invention, on the contrary, the class of the next received frame is predicted from the content of the former transmit or receive processing so that the header components of the predicted received frame are gathered from the connection management Table 705 and prepared as the receive processing header 703 in a Table 706. Upon the reception of the frame, the processor 204 collates the header (H1) 702 of the received frame and the aforementioned predicted header 703 according to a comparison routine 210. If a response to the destination is predicted as a next processing when the aforementioned receive processing header 703 is prepared, the header 704 of the acknowledgment frame is simultaneously produced and prepared in the Table 706. If the response is required, as predicted, the acknowledgment frame can be returned at a high speed to the destination (according to a high-speed routine 220). If the received frame is different from the predicted one, the header processing is accomplished (according to a normal speed processing routine 230) like the prior art with reference to the connection management Table 705.

FIGS. 8A to 8F show the representative packet formats of the protocol "ISO8073 Class 4" of one of the target transport layers to be subjected to the header prediction processing. The connection request packet CR is composed of: an LI field 401 indicating the length of the header portion; a CR code field 402CR indicating that the present packet is the CR packet; a CRT field 403 for carrying a credit value indicating the number of data packets to be transmitted at a time; a DST-REF field 404 for transporting a reference number to be used for connection discriminations at the destination; an SRC-REF field 405 for transporting a reference number to be used for connection discriminations at the destination; a class option field 408 for transporting the class and option of the transport protocol; a variable portion field 410 for transporting a variety of parameters; and a user's data field 420 for transporting the transport user's data.

The connection confirm packet CC is composed of: an LI field 401; a CC code field 402CC indicating the present packet is the CC packet; a CRT field 403; a DST-REF field 404; an SRC-REF field 405; a class option field 408; a variable portion field 410 and a user's data field 420.

The data packet DT is composed of: an LI field 401; a DT code field 402DT indicating that the present packet is the DT packet; a DST-REF field 404; a TPDU-NR EOT field 406 to be used for the order number and separate control of the data packet; a variable portion field 410 and a user's data field 420.

The acknowledgment packet AK is composed of: an LI field 401; an AK code field 402AK indicating that the present packet is the AK packet; a CRT field 403; a DST-REF field 404; a YR-TU-NR field 407 indicating that the order number of the data packet having its reception acknowledged by the present AK packet; and a variable field 410.

The connection release request packet DR is composed of: an LI field 401; a DR code field 402DR indicating that the present packet is the DR packet; a DST-REF field 404; an SRC-REF field 405; a reason field indicating a release reason; a variable portion field 410; and a user's data field 420.

The connection release acknowledgment packet DC is composed of: an LI field 401; a DC code field 402DC indicating that the present packet is the DC packet; a DST-REF field 404; an SRC-REF field 405; and a variable portion field 410.

Figure 9:
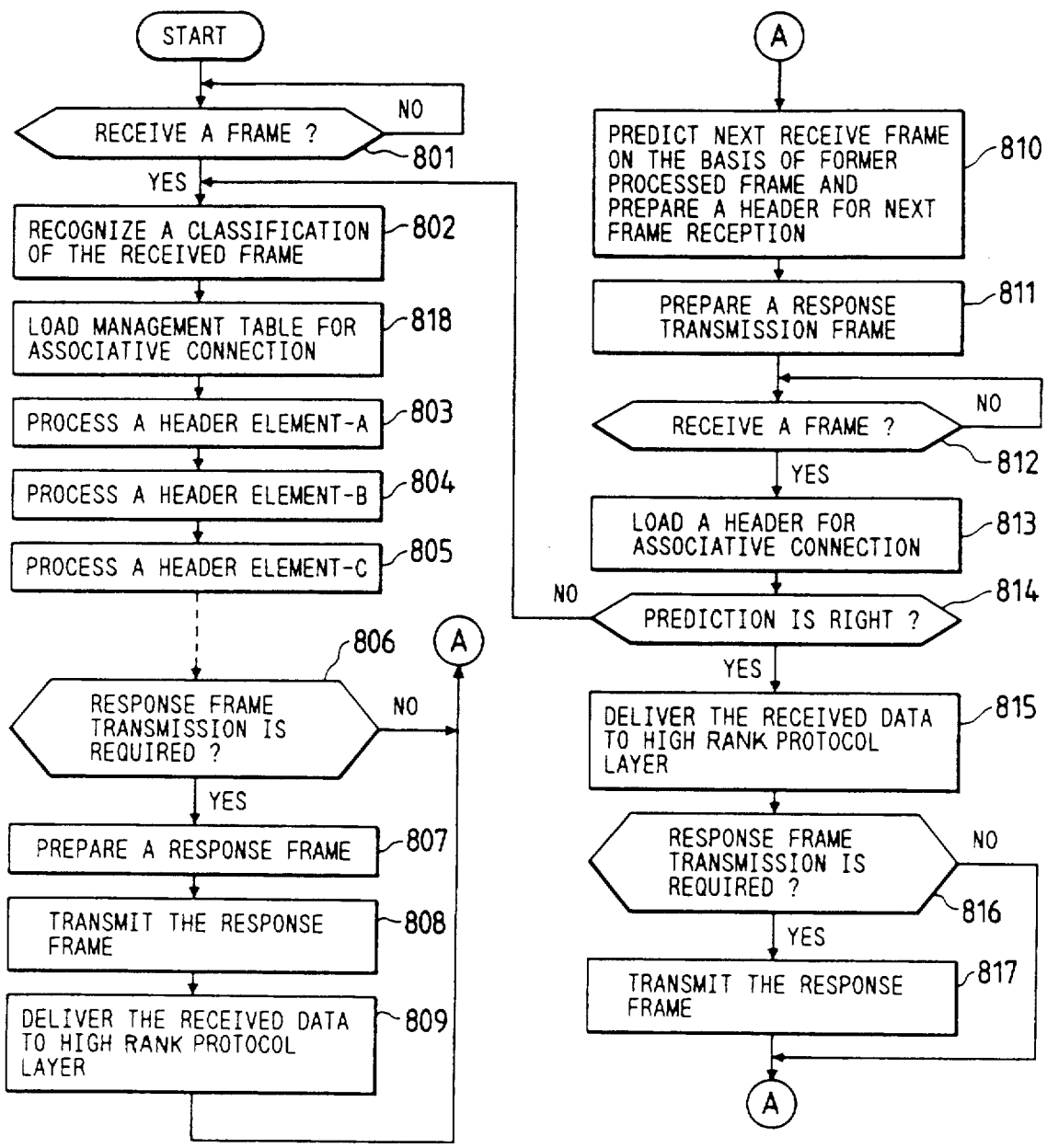
FIG. 9 is a control flow chart for increasing the speed of the receive processing and the acknowledgment sending.

FIG. 9 is a program flow chart showing the frame processing according to the aforementioned received frame predictions executed by the processor 204. First of all, the frame reception is awaited (at Step 801). When the frame is received, the class of the received frame is recognized (at Step 802) from the packet code contained in the header H1 of the received frame. In accordance with the destination address, the management Table of the connection associated with the aforementioned received frame is loaded (at Step 818). After this, the individual elements of the header such as the sequence number or credit are processed (at Steps 803 to 805). Moreover, it is determined (at Step 806) whether or not the response to the receive is required. If YES, an acknowledgment frame is prepared (at Step 807) and is transmitted (at Step 808). Then, the received data is transferred (at Step 809) to an upper-rank protocol layer, and a next receive is awaited from the partner.

According to the features of the present invention, at the end of the aforementioned transmit and receive processings of the frame, the next frame is predicted (at Step 810) in association with the status transition to be stored in the connection management Table so that a reference header for the receive processing is prepared (at Step 811) together with an acknowledgment frame for the predicted received frame to await the next frame receive. When the frame is actually received (at Step 812), the aforementioned predicted header prepared for each of the connections L1 to Ln is loaded (at Step 813) so that the header processing of the received frame can be ended (at Step 814) merely by comparing the predicted header with the header H1 of the received frame. If the header is coincident, the received data is delivered (at Step 815) to the upper-rank layer or processor. If NOT, the routine may advance to the Step 802 to accomplish the sequential checks as in the prior art. If, on the other hand, the transmission of the acknowledgment frame prepared in advance is required, the header prepared therefor in advance can be instantly used (at Steps 816 and 817) to transmit the acknowledgment frame.

The received frame predictions will be specifically described in the following in connection with the transport class 4. When the CR packet, for example, is transmitted, the connection has its status switched from CLOSED to WFCC. This WFCC is the CC wait-for status, as it is so named. After the CR transmission, therefore, the CC receive is predicted as the next received frame so that the CC header is prepared for the receive processing. After this CC receive, moreover, it is a rule to return the AK so that the AK is prepared as the acknowledgment frame. If there is no trouble in the transmission line and the destination end system, the CC frame should be next received, as predicted.

Moreover, the increased speed of processing by the frame prediction is further increased by executing the processing logic of the aforementioned flow chart with hardware.

The increased speed of the protocol processing by the frame predictions thus far described is basically applied to each of the protocol layers shown in FIG. 3 but can be applied altogether to the plural protocol layers to speed up the processing.

Figure 10:
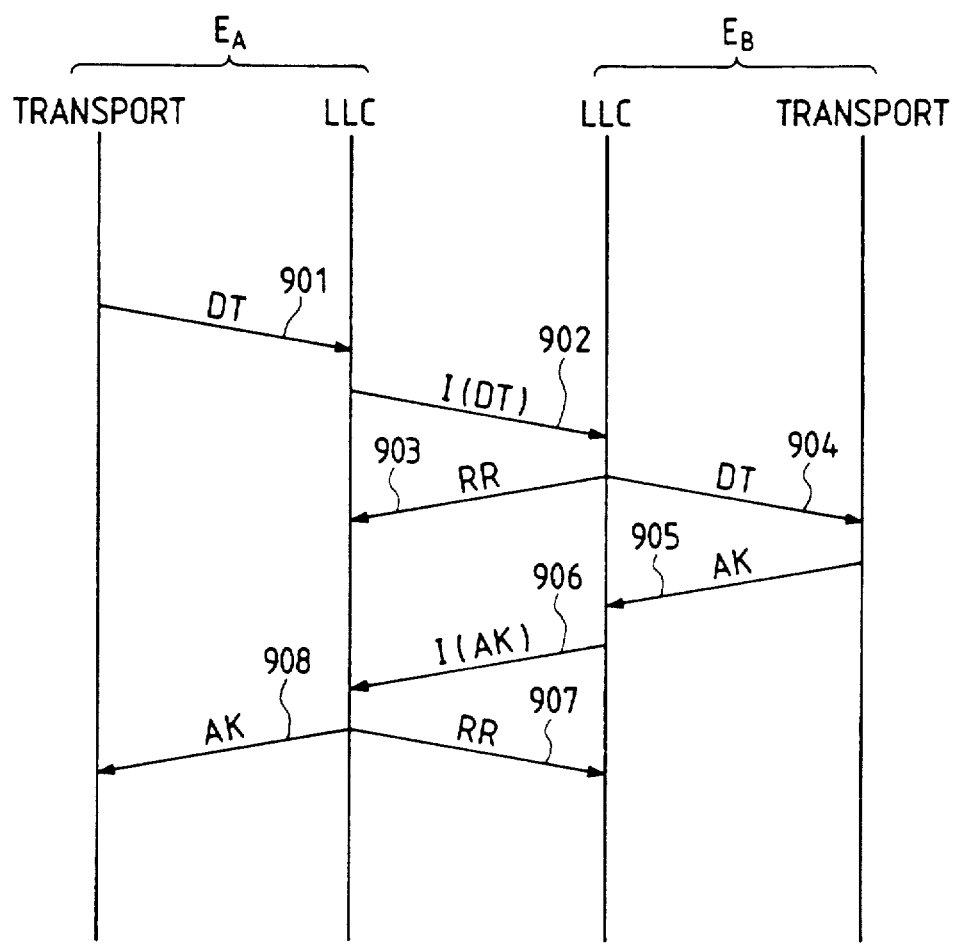
FIG. 10 is a diagram for explaining the batch processing of the layered protocols according to the present invention.

FIG. 10 shows a sequence in a case when the communications are accomplished by using two of the protocol layers of FIG. 3, i.e., a transport layer 304 and the logical line control (LLC) layer which is a sub-layer of the data link layer 302. Assume the ISO8073 Class 4 is the protocol of the transport layer and the Class 2 is the LLC. When a data transmission is required from the upper-rank layer on the side of the end system (or station) $E_A$, a transport packet (DT) 901 is transported by the I frame of the LLC to the side of the end station $E_B$. This is shown by I (DT) 902.

The end station $E_B$ predicts the I frame at the LLC and a DT 904 at the transport layer. Since the station $E_B$ processes the LLC and the transport layer in parallel, the transport layer can request the LLC to transmit an AK 905 for the DT 904 simultaneously as an RR 903 is transmitted in association with the I frame received by the LLC. The AK 905 of the transport level becomes I (AK) in the LLC. At the side of the station $E_A$, on the other hand, the LLC predicts and awaits for the reception of the I frame when it has received the aforementioned RR 903, whereas the transport layer predicts and awaits for the receive of the AK after it has transmitted the DT 901. When the LLC of the station $E_A$ receives the I (AK) 906, therefore, the transmission of an RR 907 and the reception of an AK 908 can be promptly accomplished.

The embodiment thus far described with reference to FIG. 10 has the feature that the increased speed of the frame receive processing by the frame predictions and the increased speed of the acknowledgment frame transmit processing are executed as a whole especially by the layered protocol, to achieve an effect in the speed-up of the protocol processing.

Figure 11:
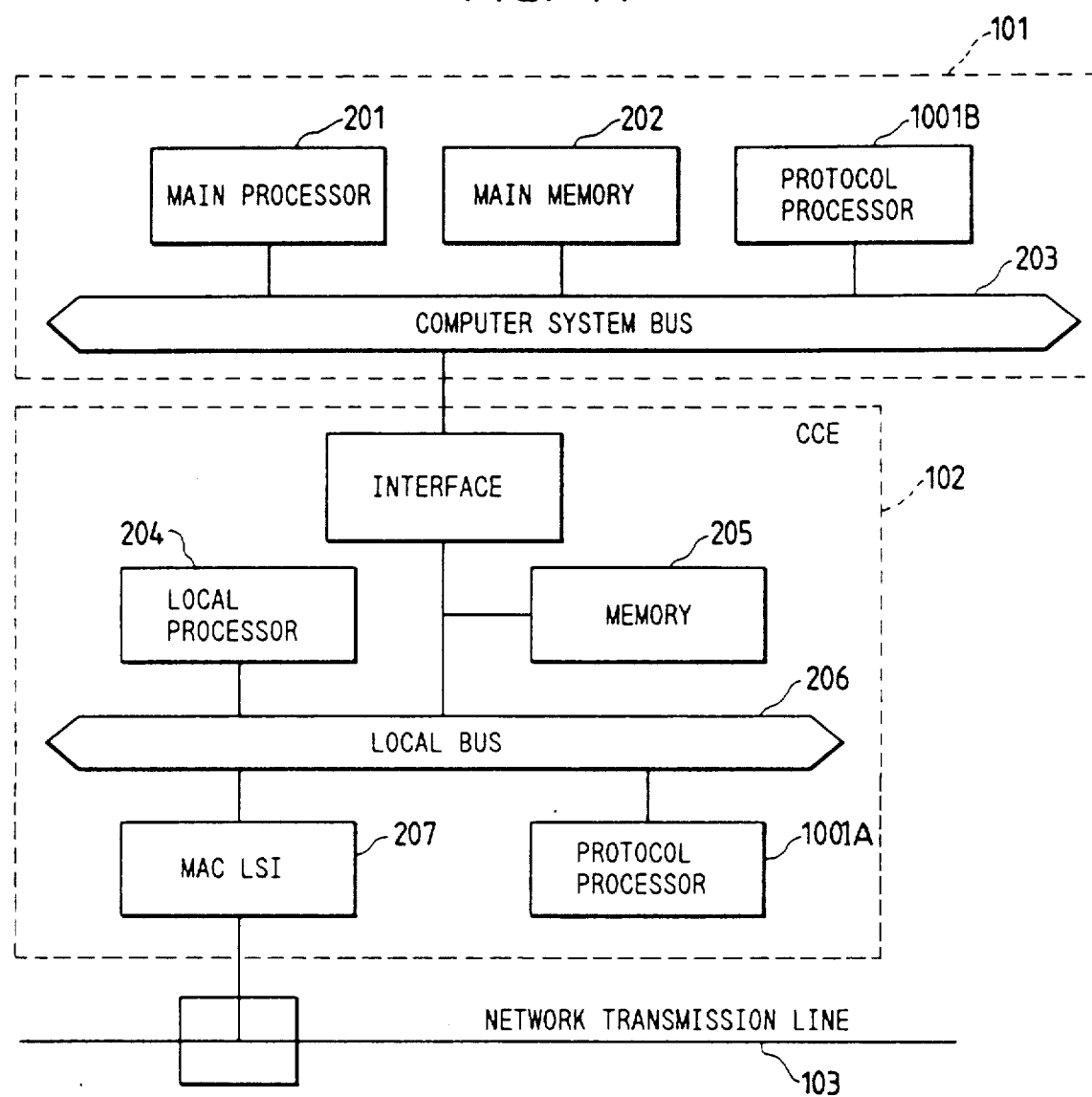
FIG. 11 is a block diagram showing a communication control equipment of an embodiment for increasing the speed of the protocol processing by hardware.

FIG. 11 shows another embodiment of the present invention for realizing the protocol processing by received frame predictions by means of hardware. In this embodiment, protocol processing circuits 1001A and 1001B are respectively added to the communication control equipment 102 and the computer main unit 101 having a block structure shown in FIG. 2. Here, the protocol processor 1001 (i.e., 1001A or 1001B) executes a portion of the communication processing, which has been accomplished by the main processor 201 or the local processor 204 in the prior art, at high speed by the hardware control.

Figure 12:
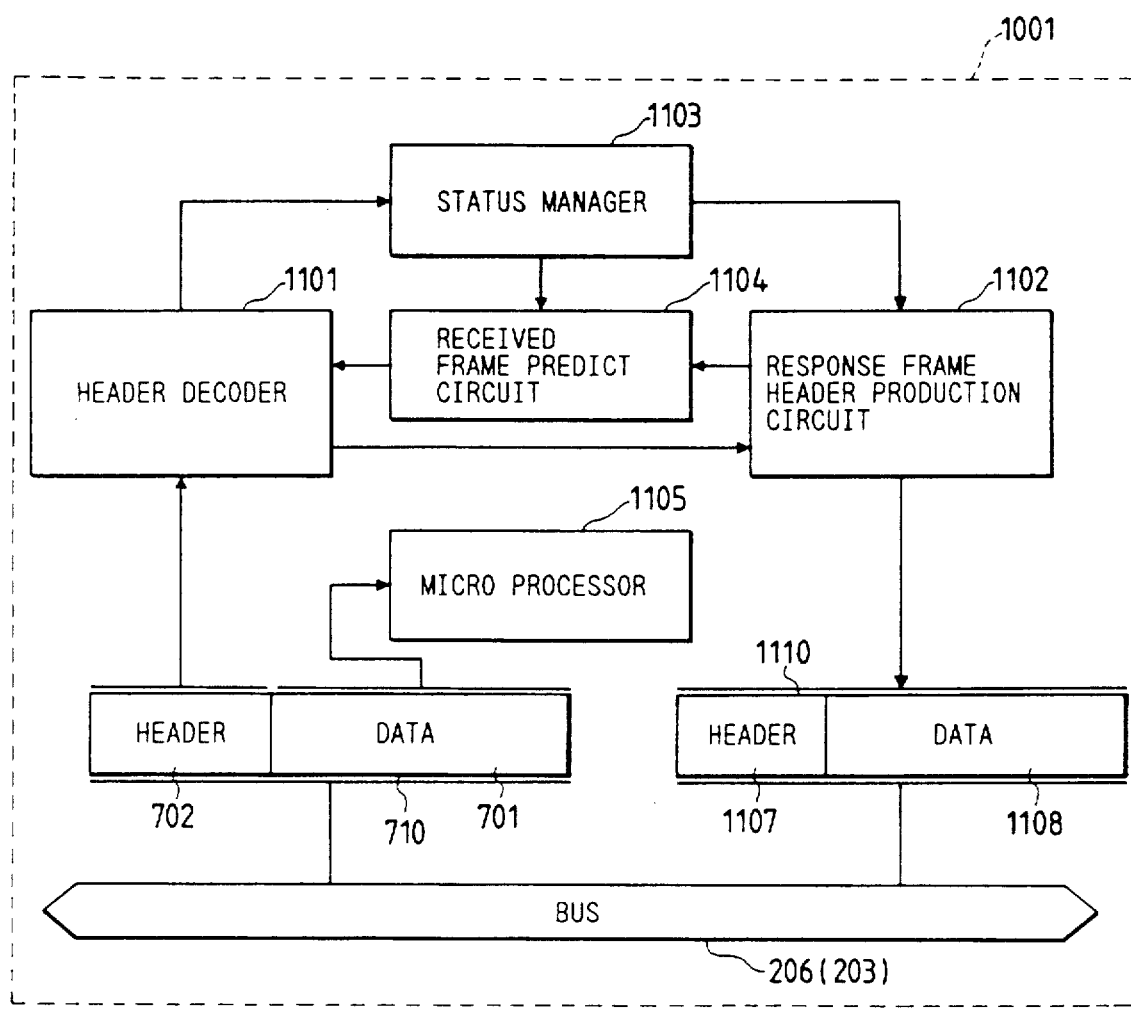
FIG. 12 is a block diagram showing the functions of the protocol processor used in the embodiment of FIG. 10.

The structure of the function blocks of the protocol processor 1001 is shown in FIG. 12. Reference numeral 710 designates a receive buffer for temporarily storing the received frame input through the data bus 206 (or 203). The data portion 701 is supplied to a micro processor 1105 and the header portion 702 is supplied to a header decoder 1101.

The header decoder 1101 accomplishes the receive processing of the aforementioned header portion 702 after the agreement check between the received header portion and that of the predicted frame. A status manager circuit 1103 updates the sequence number or the flow control information on the basis of the decoded result output from the aforementioned header decoder 1101. When the received frame is coincident with the prediction, an acknowledgment frame header production circuit 1102 combines the header 1107 of the prepared acknowledgment frame with a data portion 1108 to output the combination as an acknowledgment frame 1106 to the transmission register 1110. A received frame predict circuit 1104 predicts a next received frame from the information coming from the status manager 1103 and the acknowledgment frame header production circuit 1102 to prepare the associative check processing header with the next received frame and deliver it to the header decoder 1101. Moreover, the predicted frame information is transmitted to the response frame header production circuit 1102 to instruct the production of a next transmitted frame header. The description thus far described is the summary of the protocol high-speed processing system by the hardware control. The received data 703 is processed by the micro processor 1105.

Figure 13:
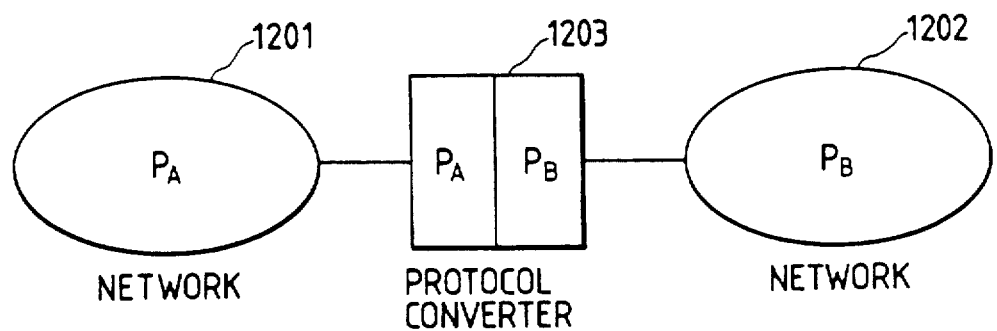
FIG. 13 is a diagram showing another network to which the present invention is applied.
Figure 14:
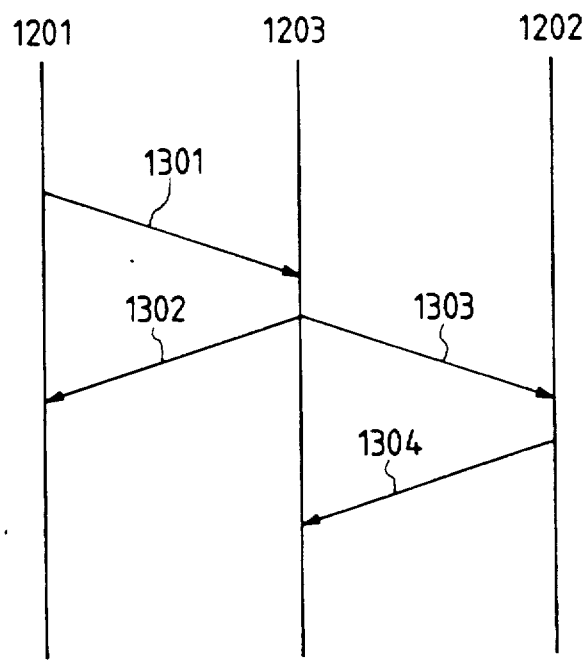
FIG. 14 is a diagram showing a sequence for explaining data transfer in the network of FIG. 13.

FIG. 13 shows a network system in which a network for communications by a protocol $P_A$ and a network 1202 for communications by a protocol $P_B$ are connected by a protocol converter 1203. The high-speed receive processing and the response high-speed transmit processing by the aforementioned frame predictions according to the present invention can also be applied to the aforementioned protocol converter 1203 so that both the acknowledgment transmission 1302 to a data reception coming from the network 1201, as shown in FIG. 14, and the transmit data 1303 of the data 1301 to a network B can be executed at high speed by the protocol converter 1203.

As has been described hereinbefore, according to the present invention, the speed of receive processing when the frame is actually received is increased by predicting the next frame to be received. This receive processing can be combined with the transmission of the acknowledgment frame for further increases in speed. The receive processing of the transport layer, for example, takes about 2.4 msec. for the request for the DT reception to the AK transmission. If, however, the DT receive processing speed is increased according to the present invention, the AK transmit request can be substantially ignored to shorten the processing time to about 1.5 msec.

We claim:

1. A communication control method for communicating between first and second stations operatively associated by a network line, in accordance with a predetermined communication protocol, the method comprising the steps of:
  receiving and identifying a first communication frame of a first kind transmitted from said second station by said network line;
  transmitting a second communication frame of a second kind to said second station by said network line; and
  selectively predicting a kind of a third communication frame which is next expected to be received from said second station on the basis of the kind of either the first communication frame received in said receiving step and the second kind of the second communication frame transmitted in said transmitting step;
  preparing a header data including plural pieces of header element information for a header processing to be executed when a next communication frame is received by the first station in accordance with the kind of third communication frame;
  waiting for the actual reception of said third communication frame;
  comparing at least a part of a header of said next communication frame with said header data previously prepared when said next communication frame is actually received; and,
  processing said actually received next communication frame in accordance with a result of said comparing.

2. The communication control method according to claim 1, further comprising:
  preparing a header portion of a communication frame to be transmitted to said second station next time in accordance with a result of said predicting of the third communication frame; and,
  preparing the communication frame to be transmitted by using said header portion and transmitting said prepared communication frame to said second station if it is determined that the kind of said actually received third communication frame is coincident with said predicting one.

3. The communication control method according to claim 1, wherein the header data to be prepared in said preparing step comprises a plurality of bits corresponding to a header portion of the communication frame predicted to be next received, and
  the comparing judges the coincidence of the kind of actually received next communication frame with that of the predicted one by comparing a header portion of the actually received next communication frame with said header data when the next communication frame is actually received.

4. The communication control method according to claim 1, wherein said communication protocol is composed of a plurality of layers, and
  the operations of the predicting are executed in parallel with at least two of said plural protocol layers.

5. A communication control device for data communication with other communication devices connected through a communication line in accordance with a predetermined communication protocol comprising:
  first means for transmitting and receiving a communication frame with a predetermined format to and from said communication line;
  second means for preparing a reference header including plural pieces of header element information for use in a header processing of a next communication frame to be received next time by predicting the kind of said next communication frame in accordance with the kind of a predicting communication frame transmitted to or received from the communication line by said first means;
  third means for judging whether or not a new communication frame actually received by said first means belongs to said predicted kind by collating said reference header with a header portion of said received new communication frame, and
  fourth means for processing said actually received new communication frame in accordance with the result of said judgment by said third means.

6. The method of claim 1 wherein when it is determined that the kind of said new communication frame is not coincident with said predicted one, a sequential comparing step sequentially compares header element information composing the header of said third communication frame with header element information stored in a memory means for managing a communication between said two stations according to said predetermined communication protocol.

7. The communication control equipment according to claim 6, further comprising:
means for judging the kind of actually received new communication frame by sequentially comparing header elements composing the header of said new communication frame with header element information stored in a memory means for managing a communication between two stations according to said predetermined communication protocol when it was judged by said third means that the kind of said new communication frame is not coincident with said predicted one.

* * * * *

UNITED STATES PATENT AND TRADEMARK OFFICE
CERTIFICATE OF CORRECTION

PATENT NO. : 5,056,058

DATED : October 8, 1991

INVENTOR(S) : Tetsuhiko Hirata, et al.

It is certified that error appears in the above-identified patent and that said Letters Patent is hereby corrected as shown below:

Claim 5, column 10, line 48, delete "predicting" and insert therefor --preceding--.

Signed and Sealed this

Nineteenth Day of January, 1993

Attest:

DOUGLAS B. COMER

*Attesting Officer*  *Acting Commissioner of Patents and Trademarks*